United States Patent
Lee

(10) Patent No.: US 6,193,367 B1
(45) Date of Patent: Feb. 27, 2001

(54) QUICK RELEASE GLASSES LENS

(75) Inventor: Ming-Yueh Lee, Shin Chuang (TW)

(73) Assignee: Jannack Corporation, Taipei (TW)

( * ) Notice: Subject to any disclaimer, the term of this patent is extended or adjusted under 35 U.S.C. 154(b) by 0 days.

(21) Appl. No.: 09/516,217

(22) Filed: Mar. 1, 2000

(51) Int. Cl.[7] .................................................. G02B 1/00
(52) U.S. Cl. .............................. 351/86; 351/83; 351/103; 351/106
(58) Field of Search ............................... 351/86, 83, 103, 351/106, 59, 41

(56) References Cited

U.S. PATENT DOCUMENTS 5,467,148 * 11/1995 Conway ................................. 351/85
6,132,041 * 10/2000 Lin ...................................... 351/106

* cited by examiner

*Primary Examiner*—Hung Xuan Dang
(74) *Attorney, Agent, or Firm*—Rosenberg, Klein & Lee

(57) ABSTRACT

A quick release glasses lens comprises a main frame and lens. The main frame comprises a front rod in arc shape having two legs secured to its two ends, respectively. The center part of the front rod is formed with a clip having recess at its edge, and a trough inside of the recess. The rod further comprises a pair of protuberances at respective sides, each protuberance has a stopper at the front end, the lens have a thickness which is to be fitted into the width of the recess, a hole corresponding to the protuberance, and a protuberance which is to be inserted into the trough of the recess for positioning the lens at place.

3 Claims, 12 Drawing Sheets

QUICK RELEASE GLASSES LENS

FIELD OF THE INVENTION

This invention relates to a quick release glasses lens, and more particularly to a glasses with an easy and quick install and uninstall lens.

BACKGROUND OF THE INVENTION

In the past, conventional glasses on the market are mostly adapting fasteners to secure the lens to the frame. Now, the structure has been improved to use an inserting method to secure the lens to the glasses, as shown in FIG. 12, which has a rod and a nose pad. The rod is formed with a gap which comprises a number of protuberances on the inner wall. The lens also has a number of holes corresponding to the protuberances, thus, when the lens are inserted into the gap, each protuberance will be inserted into a corresponding hole.

However, such design has some shortcomings, one of which is that the material of the lenses is made of plastics which is trend of fatigue after a period of time, and the supporting design will not be strong enough, thus, the lens will be loosed and even shaking.

In view of this, the inventor has invented the present invention to correct the shortcomings.

SUMMARY OF THE INVENTION

It is the primary object of the present invention to provide a quick release glasses lens which is easy and quick to install and uninstall of the lens from a pair of glasses.

It is another object of the present invention to provide a quick release glasses lens which is stable and lasts longer than prior art.

It is a further object of the present invention to provide a quick release glasses lens which saves time in replacing lens.

DETAILED DESCRIPTION OF THE PREFERRED EMBODIMENTS

Figure 1:
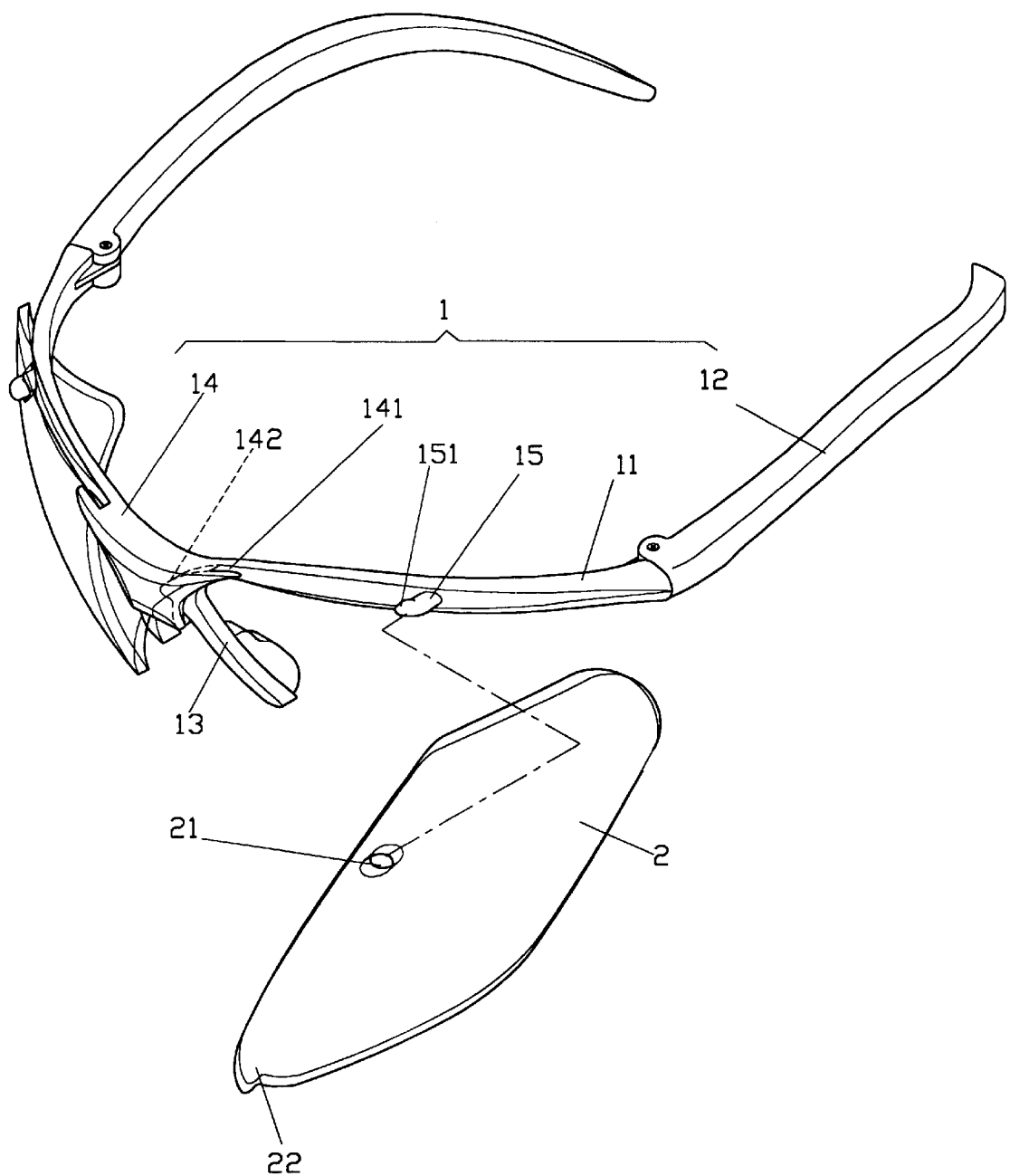
FIG. 1 is an exploded view of the present invention.

A glasses of the present invention, as shown in FIG. 1, comprises a main frame 1 and a pair of lenses 2.

The frame 1 has a rod 11 in an arc shape and two feet 12 connected to the respective ends of the rod 11. The center portion of the rod 11 extends downward to form a nose support 13. The top center position of the rod 11 has a triangle shaped clip 14 formed with a recess 141 at inside and a trough 142 along the inner edge of the recess 141, a pair of protuberances 15 are formed on the respective sides of the rod 11 with a transverse stopper 151 at the front end of each stopper 15.

Each of the lenses 2 has a hole 21 corresponding to the stopper 15, the thickness of the lens 2 corresponding to the width of the recess 141, a protuberance 22 has protruding from the edge of the lens 2.

Figures 2, 2A:
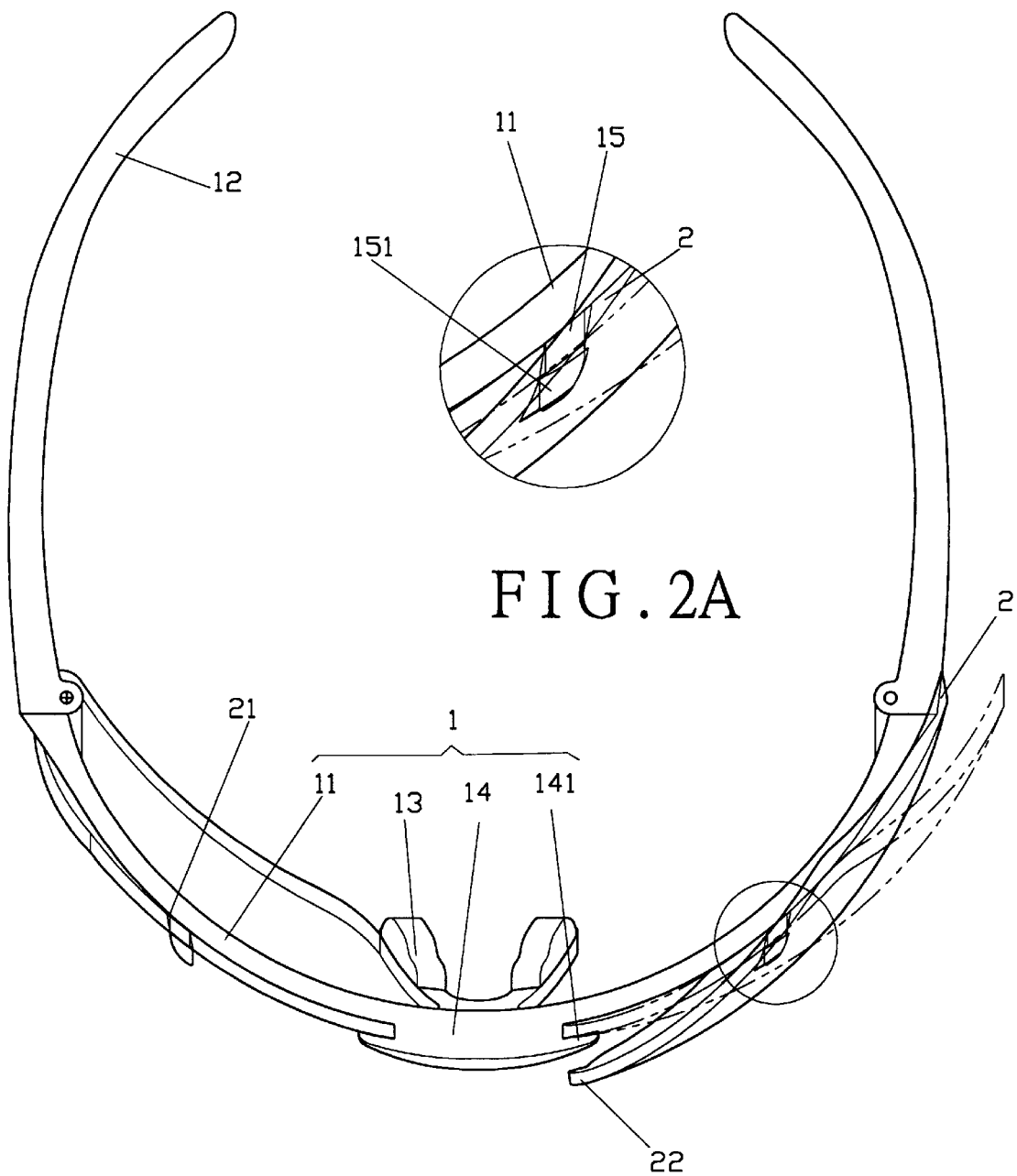
FIG. 2 is a front view of the present invention.
FIG. 2A is an enlarged, partly section, view of FIG. 2.
Figure 3:
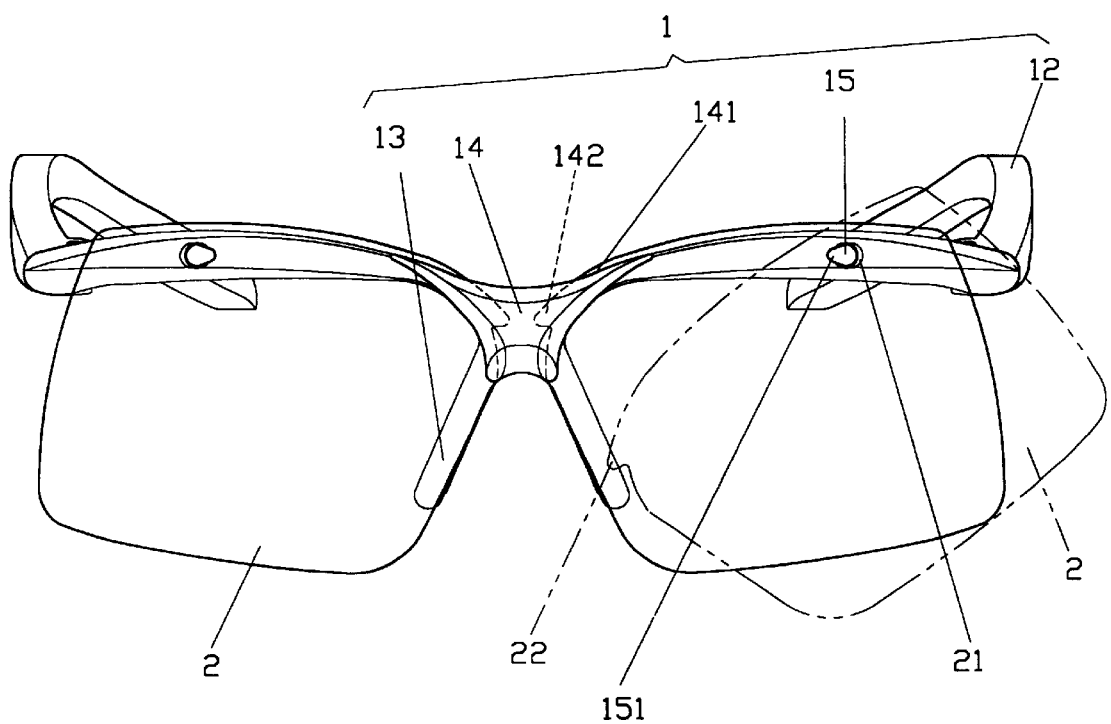
FIG. 3 is a perspective view of the present invention, showing installation.
Figure 4:
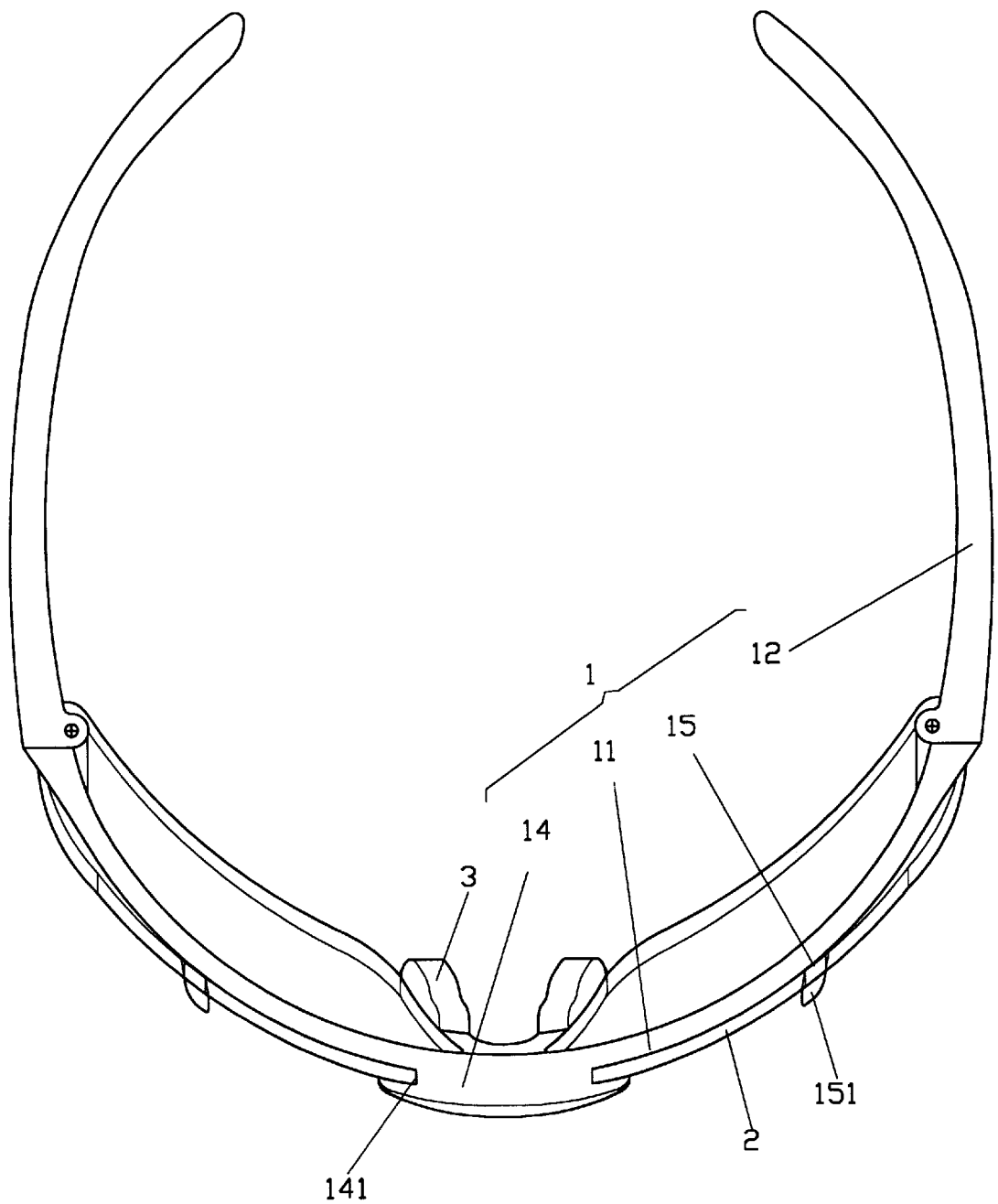
FIG. 4 is a top view of the present invention.

To assemble, referring to FIGS. 2, 2A and 3, insert the lenses 2 into the recess 141 by aligning the hole 21 to the protuberance 15 and incline to an angle which allows the stopper 151 to pass the hole 21, then gradually push the lens with the protuberance 22 towards the nose support 13 until it engages with the trough 142. The protuberance 22 of the lens 2, at this time is securely attached to the frame 1 and confines any movement of the lens 2, as shown in FIG. 4. The stopper 151 of the protuberance 15 may be formed on top of the protuberance 15.

Figure 5:
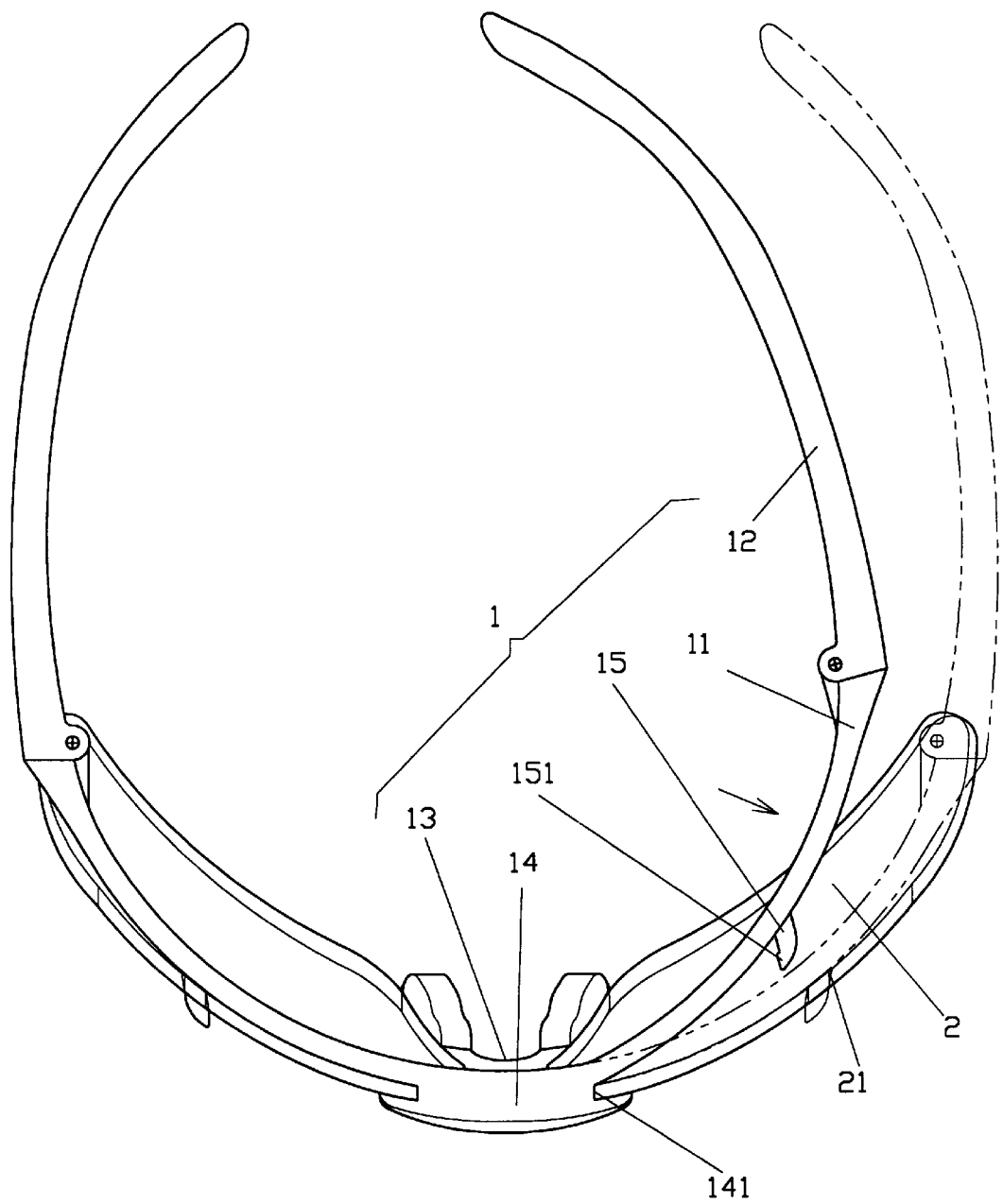
FIG. 5 is a top view of the present invention, showing installation.
Figure 6:
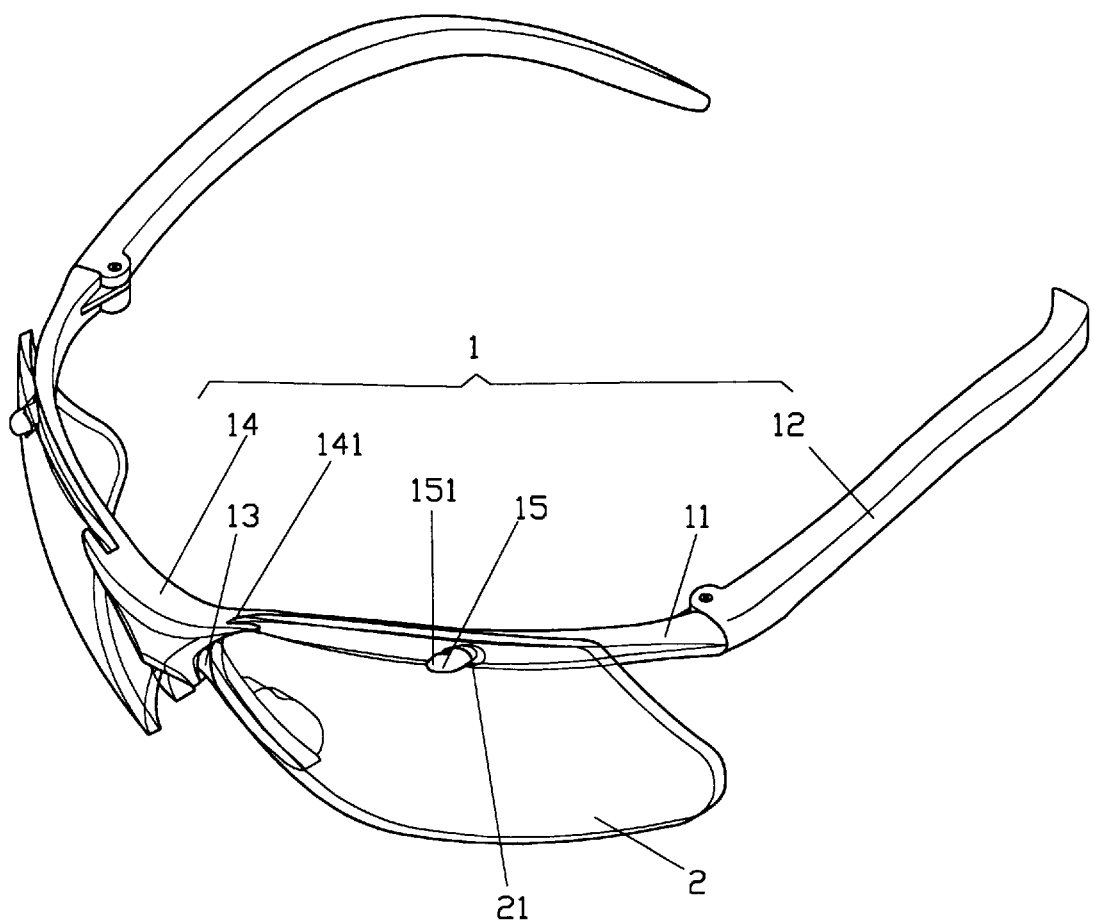
FIG. 6 is a perspective view of the present invention.

FIGS. 5 and 6 show a second assembly process of the present invention, which is to press the lens 2 to force the edges of the lens 2 clipping into the recess 141 of the clip 14, then bend the rod 11 to press the protuberance 15 into the hole 21 and release the rod 11 to its original position. The elastic character of the rod 11 shall bring the protuberance 15 to an angle differ from the hole 21, this will also hold the lens 2 to the frame 1 firmly.

Figure 7:
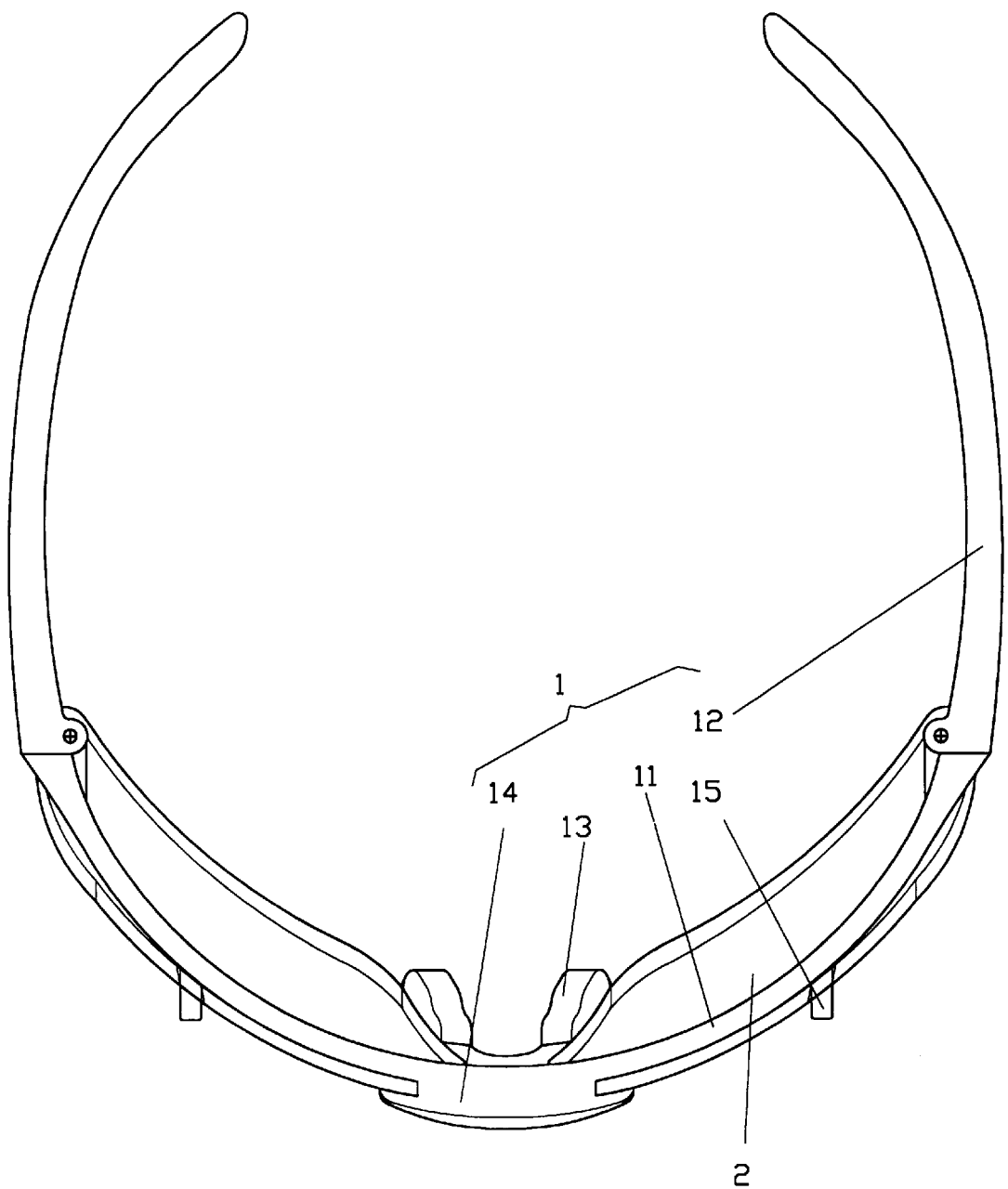
FIG. 7 is a top view of a second embodiment of the present invention.
Figure 8:
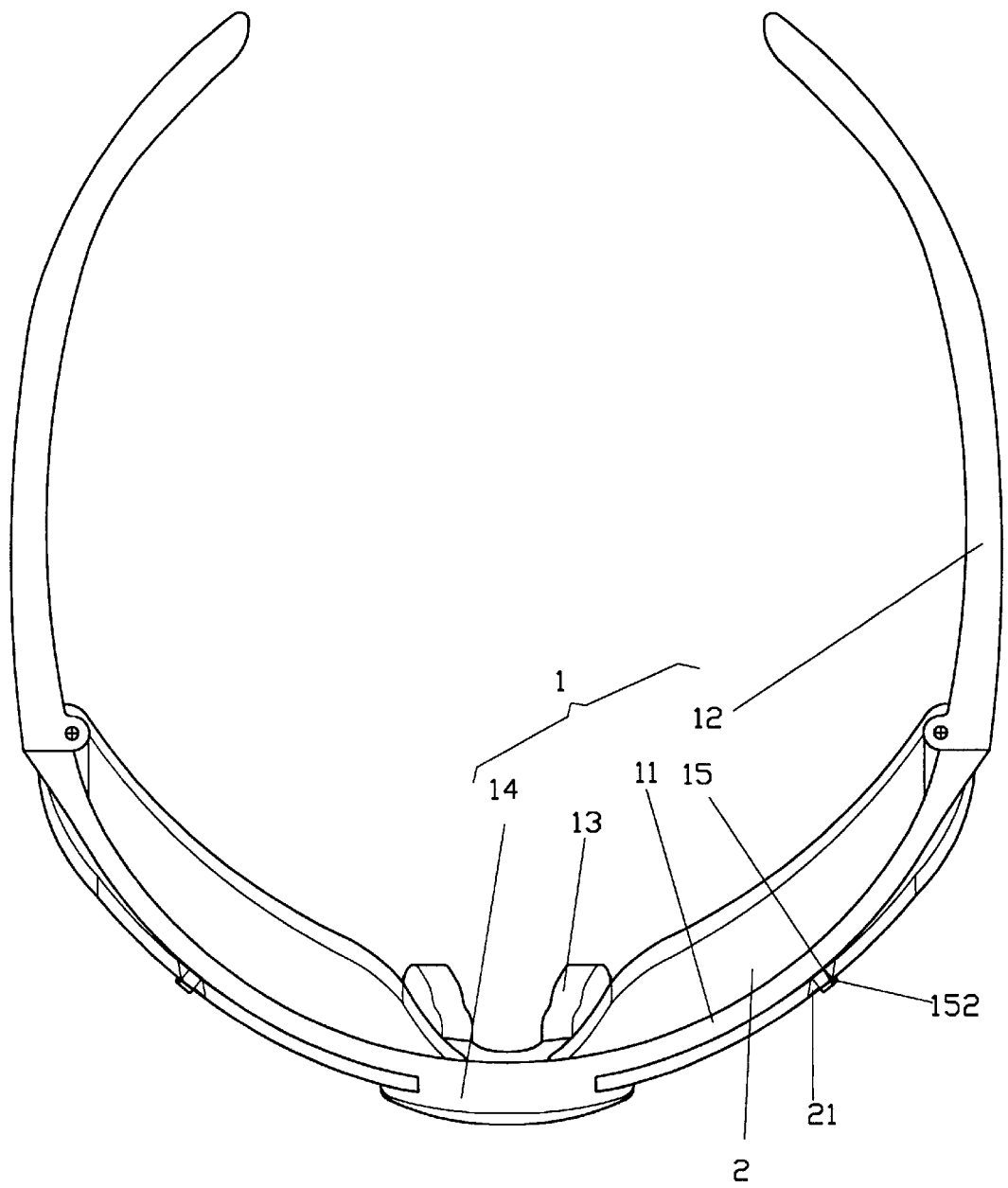
FIG. 8 is a top view of a third embodiment of the present invention.

The protuberance 15 may be formed in a cylindrical shape along the rod 11, as shown in FIG. 7. When assembly, the lens 2 can still hold to the frame 1 firmly, just by the angle of the hole 21 with respect to the protuberance 15 and the design of the clip 14 shall assist the lens 2 to be held securely on the frame 1. FIG. 8 has shown another embodiment of the present invention which is formed with a knob 152 which is to block the hole 21 from disengage, thus the lens 2 are securely connected to the frame 1.

Figure 9:
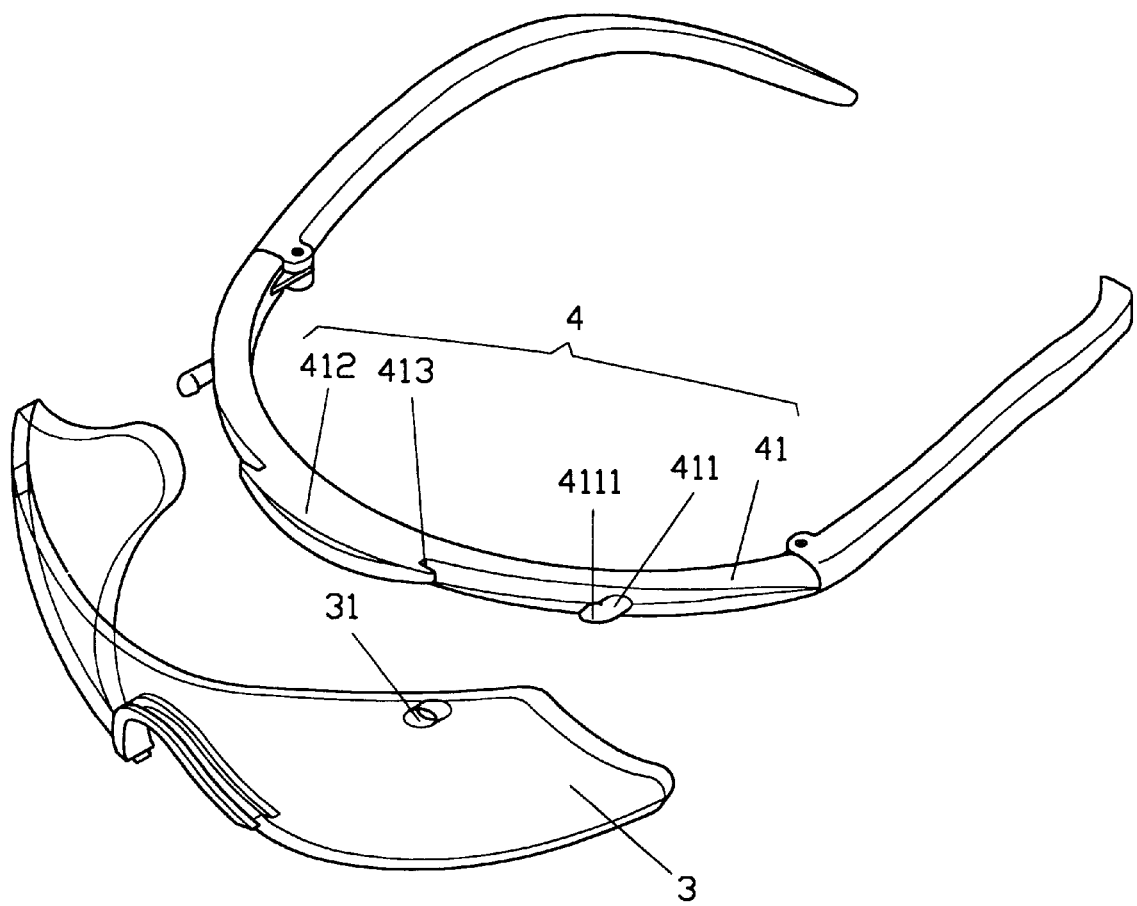
FIG. 9 is a top view of a fourth embodiment of the present invention.
Figure 10:
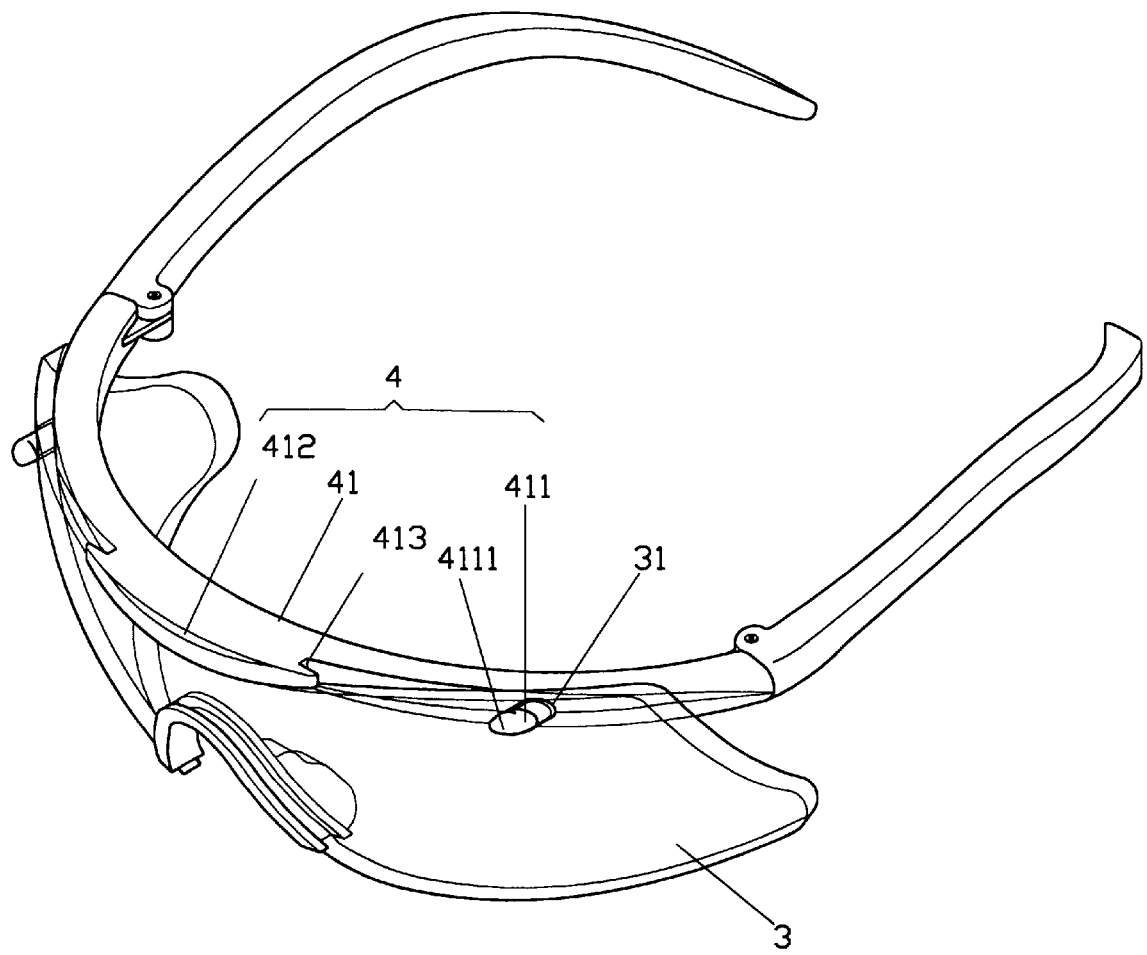
FIG. 10 is a top view of a fifth embodiment of the present invention.

A one piece lens 3 is also adapted in this invention, as shown in FIGS. 9 and 10, the lens 3 also have formed with holes 31 which corresponding to the protuberances 411. The center portion of the rod 41 has a clip 412 which has a recess 413 at the bottom end to clip the lens 3. The protuberances 411 at the two sides of the rod 41 are formed with a stopper 4111, respectively. To assemble, insert the edge of the lens 3 into the recess 413, bend the frame 4 to align the protuberances 411 to the holes 31, and press the lens 3 to force the holes 31 passing through the stopper 41 11 and engage with the protuberances 411. Upon release the frame 4, an incline angle of the lens 3 with respect to the frame 4 forms a stable connection of the frame 4 and the lens 3.

Figure 11:
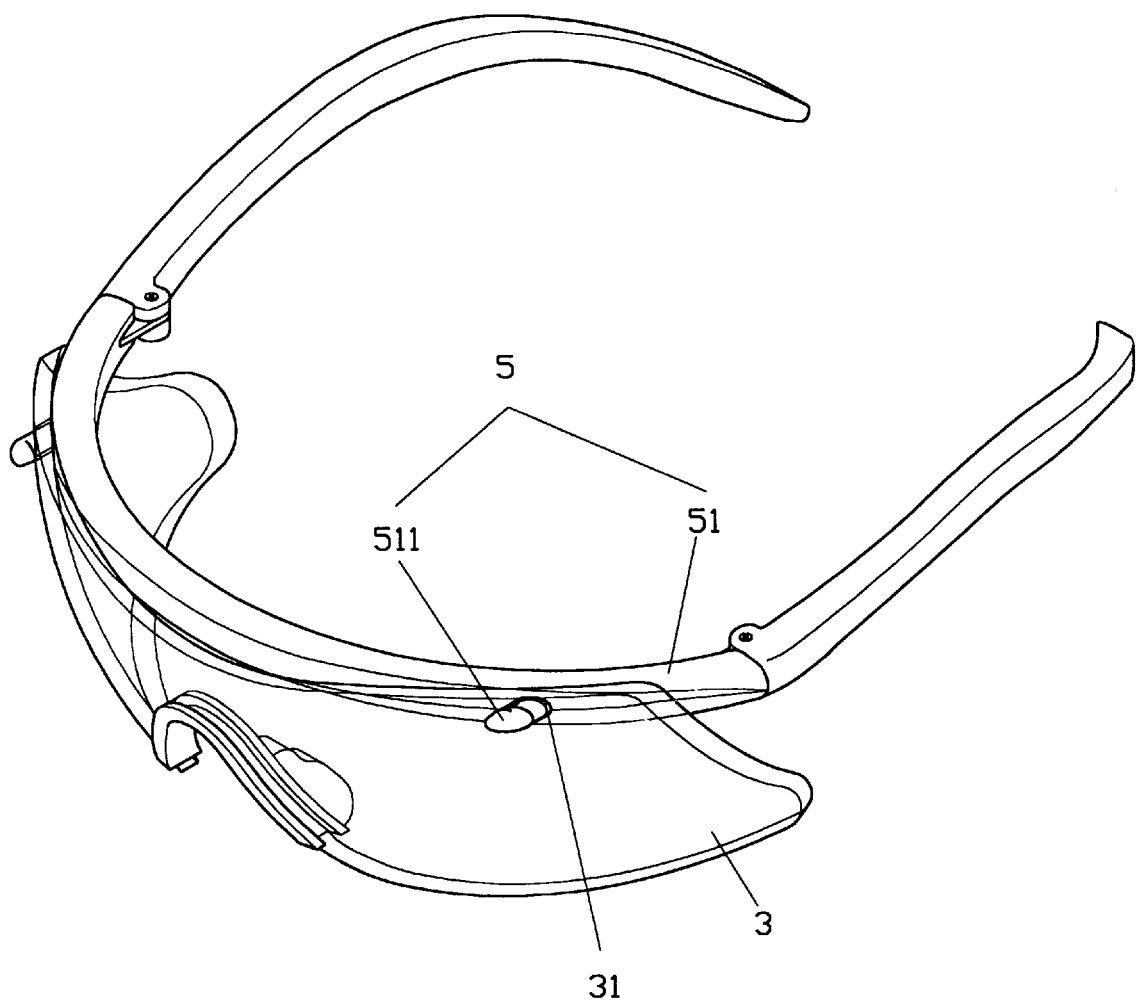
FIG. 11 is a top view of a sixth embodiment of the present invention.
Figure 12:
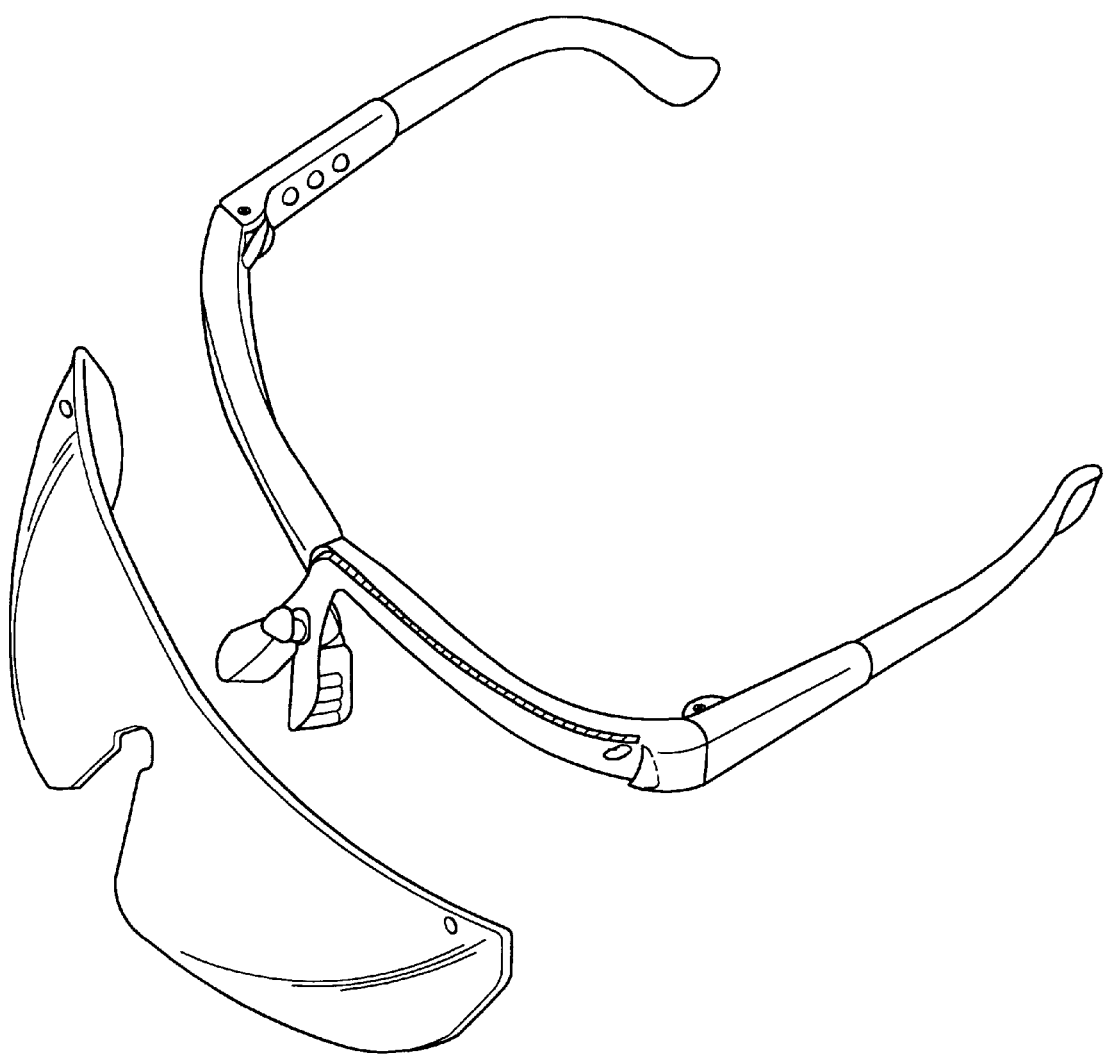
FIG. 12 is a prior art.

FIG. 11 shows a further embodiment of the present invention which has the rod 51 of the frame 5 in an arc shape with two protuberances 511 at respective ends. To assemble, bend the rod 5 Ito align the protuberances 511 to the holes 31 of the lens 3, then press the lens 3 to force the holes 31 pass slide onto the protuberances 511.

I claim:

1. A quick release glasses lens comprising a frame and a pair of lenses, said frame having an arc rod, and the improvements comprising:

said rod having a clip with a recess at inside and a trough along the inner edge of said recess, and a pair of protuberances at respect sides with a stopper on the end of each said protuberance;

said lenses having a thickness corresponding to the gap of said recess, and each said lens comprising a hole corresponding to said protuberance of said rod of said frame and a protuberance protruding from one end of said lens; whereas upon said protuberances of said rod inserted through said holes of said lenses, and said protuberance of said lenses clipping into said trough, said lenses being secured to said frame in a stable manner.

2. The quick release glasses lens as recited in claim 1, wherein said protuberances of said rod are formed in a cylindrical shape extending forward from said rod and form a knob at the end of said protuberance.

3. The quick release glasses lens as recited in claim 1, wherein said rod of said frame having a clip at center portion, said clip having a recess, and said rod having further comprising a pair of protuberances at respective ends, said lens being in a one piece form and having a pair of holes corresponding to said protuberances of said rod of said frame, to assemble, insert the edge of said lens into said recess, then bend said frame to align said protuberances to said holes, and then by pressing said lens to force said protuberances inserting through said holes, thus, upon releasing said frame, an inclining angle of said holes of said lens with respect to said protuberances of said rod keeping said lens in place firmly.

\* \* \* \* \*